United States Patent
Kodama et al.

(10) Patent No.: US 9,148,184 B2
(45) Date of Patent: Sep. 29, 2015

(54) POWER DETECTION CIRCUIT AND POWER DETECTION METHOD

(75) Inventors: Hiroshi Kodama, Tokyo (JP); Masaki Kitsunezuka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/579,871

(22) PCT Filed: Dec. 15, 2010

(86) PCT No.: PCT/JP2010/007286
§ 371 (c)(1),
(2), (4) Date: Aug. 17, 2012

(87) PCT Pub. No.: WO2011/114408
PCT Pub. Date: Sep. 22, 2011

(65) Prior Publication Data
US 2012/0313680 A1    Dec. 13, 2012

(30) Foreign Application Priority Data
Mar. 17, 2010   (JP) .................................. 2010-060294

(51) Int. Cl.
*H03L 7/06*    (2006.01)
*H04B 1/10*    (2006.01)
*H04B 1/30*    (2006.01)

(52) U.S. Cl.
CPC ............... *H04B 1/1027* (2013.01); *H04B 1/30* (2013.01)

(58) Field of Classification Search
USPC .......................................................... 327/157
See application file for complete search history.

(56) References Cited

U.S. PATENT DOCUMENTS 7,139,540 B2 * 11/2006 Wu et al. ..................... 455/251.1
7,974,598 B2 *  7/2011 Kong et al. ................. 455/226.2

(Continued)

FOREIGN PATENT DOCUMENTS

JP     9-098141 A     4/1997
JP  2004-128763 A     4/2004

(Continued)

OTHER PUBLICATIONS

International Search Report in PCT/JP2010/007286 dated Mar. 15, 2011 (English Translation Thereof).

(Continued)

*Primary Examiner* — Lincoln Donovan
*Assistant Examiner* — Patrick Chen
(74) *Attorney, Agent, or Firm* — McGinn IP Law Group, PLLC

(57) ABSTRACT

A power detection circuit according to the present invention includes a variable frequency oscillator 2 for oscillating a local oscillator frequency, a mixer 1 for receiving the local oscillator frequency and a detection signal and converting a frequency of the detection signal using the local oscillator frequency, a complex bandpass filter 3 for limiting a bandwidth of the detection signal whose frequency is converted to a predetermined bandwidth, and an energy detection circuit 4 for detecting power of the predetermined bandwidth based on an output from the complex bandpass filter 3. The local oscillator frequency is set so that the predetermined bandwidth of the detection signal whose frequency is converted is in a frequency range having low 1/f noise. According to the present invention, it is possible to provide a power detection circuit with high speed and high sensitivity.

13 Claims, 22 Drawing Sheets

(56) References Cited

U.S. PATENT DOCUMENTS

2008/0051053 A1* 2/2008 Fedan .......................... 455/296
2008/0318536 A1* 12/2008 Suominen .................. 455/150.1

FOREIGN PATENT DOCUMENTS

| | | |
|---|---|---|
| JP | 2004-266416 A | 9/2004 |
| JP | 2004-320232 A | 11/2004 |
| JP | 2007-006026 A | 1/2007 |
| JP | 2009-089269 A | 4/2009 |
| JP | 2009-273021 A | 11/2009 |
| WO | WO 2009/044431 A1 | 4/2009 |

OTHER PUBLICATIONS

J.Park, et al., "A fully integrated UHF-band CMOS receiver with multi-resolution spectra sensing (MRSS) functionally for IEEE 802.22 cognitive radio applications," IEEE J. Solid-State Circuits. vol. 44, No. 1, pp. 258-268, Jan. 2009.

Japanese Office Action dated Sep. 16, 2014 with an English Translation Thereof.

Japanese Decision to Grant a Patent dated Dec. 16, 2014 with an English translation thereof.

* cited by examiner

POWER DETECTION CIRCUIT AND POWER DETECTION METHOD

TECHNICAL FIELD

The present invention relates to a power detection circuit and a power detection method, and more specifically, to a power detection circuit and a power detection method for detecting power of radio frequency signals.

BACKGROUND ART

Regarding a technique of searching radio idler frequencies (white spaces), NPTL 1 discloses a technique related to a power detection circuit. FIG. 22 is a block diagram for describing a power detection circuit according to a related art. As shown in FIG. 22, the power detection circuit according to the related art includes a mixer 101, a variable frequency oscillator 102, a low pass filter 103, and an energy detection circuit 104.

The variable frequency oscillator 102 outputs a carrier wave 106 having a frequency equal to a reception frequency. The mixer 101 multiples the carrier wave 106 having a frequency equal to a reception frequency output from the variable frequency oscillator 102 by a reception signal 105, and outputs an in-phase component to the low pass filter 103. The low pass filter 103 removes out-of-band signals from the signal output from the mixer 101. The energy detection circuit 104 detects power in the bandwidth of the low pass filter 103.

Next, with reference to FIG. 23, an operation of the power detection circuit shown in FIG. 22 will be described. First, the frequency of the variable frequency oscillator 102 is set to an LO (local oscillator) frequency (local oscillator frequency: $f_{LO}$) which is equal to an RF (radio) frequency ($f_{RF}$) signal which is desired to be detected. This system is generally called a zero IF system or a direct conversion system. Then, as shown in FIG. 23, the mixer 101 converts the frequency of the RF frequency signal to a frequency around zero frequency (hereinafter referred to as a frequency around DC). Then, the low pass filter 103 removes the out-of-band signals, and the energy detection circuit 104 detects power in the filter bandwidth. Ideally, this detection power is equal to the power around the filter bandwidth of the RF frequency ($f_{RF}$). Further, by sweeping the LO frequency ($f_{LO}$) by changing the frequency of the variable frequency oscillator 102, it is possible to detect power of the RF frequency ($f_{RF}$) for a wide bandwidth.

CITATION LIST

Non Patent Literature

NPTL 1: J. Park et al., "A fully integrated UHF-band CMOS receiver with multi-resolution spectrum sensing (MRSS) functionally for IEEE 802.22 cognitive radio applications," IEEE J. Solid-State Circuits, vol. 44, no. 1, pp. 258-268, January 2009.

SUMMARY OF INVENTION

Technical Problem

However, the power detection circuit according to the related art shown in FIG. 22 has the following problems. While the frequency of the RF frequency signal ($f_{RF}$) is converted to the frequency around DC by the mixer 101, the level of 1/f noise is high at the frequency around DC, which causes a problem that the power detection accuracy degrades. The level of the 1/f noise becomes higher with decreasing frequency. In particular, when the circuit design is performed using a CMOS process instead of a bipolar process, 1/f noise increases. Further, as the size of the device decreases with the development of the CMOS process, 1/f noise increases.

Another problem is that, since the frequency is converted into a frequency band around DC by the mixer 101, the power detection time increases. This is because the power detection time depends on the cycle of the detection signal. In particular, the power detection time increases when the RF frequency bandwidth which is to be searched is wide or when power is detected with high accuracy in a narrow filter bandwidth (i.e., when the frequency step is finely detected). Accordingly, time required to search frequencies increases.

Based on the aforementioned problems, one exemplary object of the present invention is to provide a power detection circuit and a power detection method with high speed and high sensitivity.

Solution to Problem

A power detection circuit according to the present invention includes: a variable frequency oscillator for oscillating a local oscillator frequency; a mixer for receiving the local oscillator frequency and a detection signal and converting a frequency of the detection signal using the local oscillator frequency; a complex bandpass filter for limiting a bandwidth of the detection signal whose frequency is converted to a predetermined bandwidth; and an energy detection circuit for detecting power of the predetermined bandwidth based on an output from the complex bandpass filter, in which the local oscillator frequency is set so that the predetermined bandwidth of the detection signal whose frequency is converted is in a frequency range having low 1/f noise.

A power detection method according to the present invention includes: setting a local oscillator frequency; converting a frequency of a detection signal using the local oscillator frequency; limiting a bandwidth of the detection signal whose frequency is converted to a predetermined bandwidth; and detecting power of the predetermined bandwidth of the detection signal whose frequency is converted, in which the local oscillator frequency is set so that the predetermined bandwidth of the detection signal whose frequency is converted is in a frequency range having low 1/f noise when setting the local oscillator frequency.

Advantageous Effects of Invention

According to the present invention, it is possible to provide a power detection circuit and a power detection method with high speed and high sensitivity.

DESCRIPTION OF EMBODIMENTS

First Exemplary Embodiment

Hereinafter, exemplary embodiments of the present invention will be described with reference to the drawings.

Figure 1:
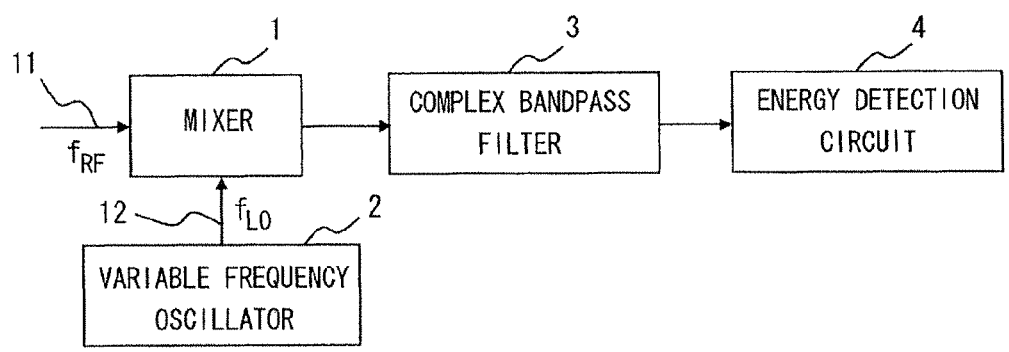
FIG. 1 is a block diagram showing a power detection circuit according to a first exemplary embodiment.

FIG. 1 is a block diagram showing a power detection circuit according to a first exemplary embodiment. The power detection circuit according to the first exemplary embodiment includes a mixer 1, a variable frequency oscillator 2, a complex bandpass filter 3, and an energy detection circuit 4. A detection signal ($f_{RF}$) 11 is input to the mixer 1 from an antenna. The variable frequency oscillator 2 oscillates a predetermined local oscillator frequency ($f_{LO}$). The mixer 1 multiplies the local oscillator frequency 12 output from the variable frequency oscillator 2 by the detection signal 11 to convert the frequency, to output an in-phase component to the complex bandpass filter 3. The complex bandpass filter 3 removes out-of-band signals from the signal output from the mixer 1. The energy detection circuit 4 detects power in the bandwidth of the complex bandpass filter 3.

Figure 2:
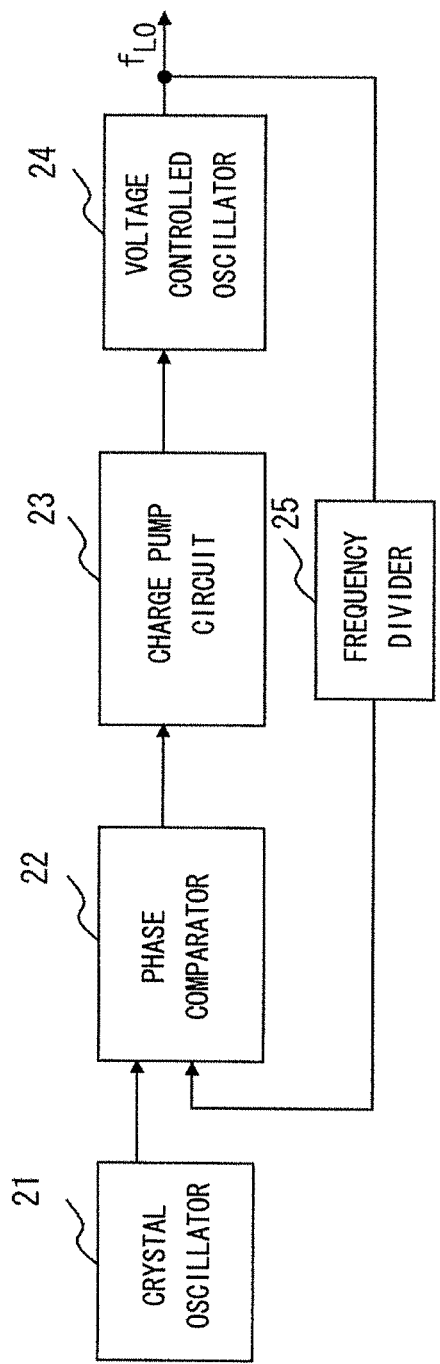
FIG. 2 is a block diagram showing one example of a variable frequency oscillator used in the power detection circuit according to the first exemplary embodiment.

FIG. 2 is a block diagram showing one example of the variable frequency oscillator 2 used in the power detection circuit according to the first exemplary embodiment. The variable frequency oscillator 2 shown in FIG. 2 includes a feedback loop of a crystal oscillator 21 for generating a reference frequency, a phase comparator 22, a charge pump circuit 23, a voltage controlled oscillator 24, and a frequency divider 25. The variable frequency oscillator 2 shown in FIG. 2 is a so-called PLL (Phase Locked Loop) circuit. In this case, it is possible to switch an output frequency by switching the frequency dividing ratio of the frequency divider 25. The output frequency can also be switched in the same way by providing a variable frequency divider at a stage subsequent to the voltage controlled oscillator 24 or a stage previous to the phase comparator 22.

Figure 3:
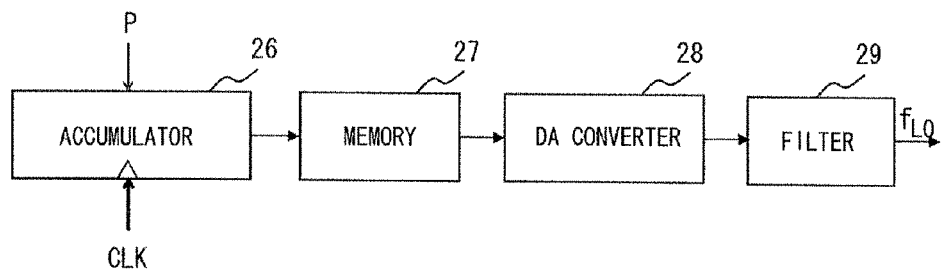
FIG. 3 is a block diagram showing another example of the variable frequency oscillator used in the power detection circuit according to the first exemplary embodiment.

FIG. 3 is a block diagram showing another example of the variable frequency oscillator 2 used in the power detection circuit according to the first exemplary embodiment. The variable frequency oscillator 2 shown in FIG. 3 includes an accumulator 26, a memory 27, a DA converter 28, and a filter 29. The variable frequency oscillator shown in FIG. 3 is a so-called DDS (Direct Digital Synthesizer). The accumulator 26 includes a function of cumulatively adding numerical data and resetting the data. An increment P of the cumulative data is determined from the frequency that is set, and the numerical value of the output data increases for each clock CLK. The output of the accumulator 26 is passed to the memory 27 as a reading address. This data corresponds to the phase of the waveform that is eventually output. When the increment of the data of the accumulator 26 is small, the phase advances slowly, and the waveform data is output to the DA converter 28 as a low-frequency signal. On the other hand, when the increment of the accumulator 26 is large, the waveform data is read intermittently, and a high-frequency signal is output. In summary, the output frequency can be switched by switching the value of the step P of the accumulator 26 or the operation frequency of the accumulator 26.

Figure 4:
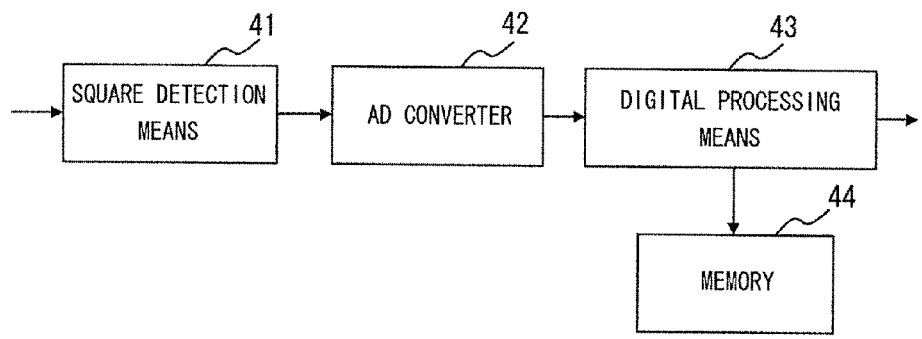
FIG. 4 is a block diagram showing one example of an energy detection circuit used in the power detection circuit according to the first exemplary embodiment.

FIG. 4 is a block diagram showing one example of the energy detection circuit 4. The energy detection circuit 4 includes a square detection means 41, an AD converter 42, a digital processing means 43, and a memory 44. The use of the complex bandpass filter 3 provided at the previous stage of the energy detection circuit 4 limits the bandwidth of the signal input to the square detection means 41. In general, while the energy can be detected at high speed by widening this bandwidth, the energy can be detected with high sensitivity by narrowing this bandwidth. In short, it is possible to detect minute energy.

The square detection means 41 detects the energy by analog computation using an integrator or the like, for example. Then, an analog output signal from the square detection means 41 is converted into a digital signal by the AD converter 42, and this digital signal is processed by the digital processing means 43, whereby it is possible to generate control signals according to the signal intensity. This control signal is supplied, for example, to an analog processing unit. Further, by writing and storing into the memory 44 the results of the signal processing by the digital processing means 43, it is possible to form a plurality of energy detection results into a database. Accordingly, by referring to this database, it is possible to generate control signals depending on the plurality of energy detection results. The reason why such digital signal processing is used is that, when a recent miniaturized CMOS process is used, it has high compatibility with a digital circuit.

Figure 5:
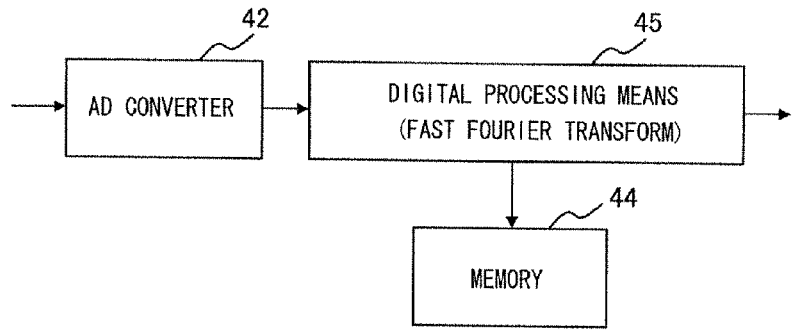
FIG. 5 is a block diagram showing another example of the energy detection circuit used in the power detection circuit according to the first exemplary embodiment.

FIG. 5 is a block diagram showing another example of the energy detection circuit 4. The energy detection circuit 4 shown in FIG. 5 includes an AD converter 42, a digital processing means (fast Fourier transform) 45, and a memory 44. The AD converter 42 converts an analog output signal from the complex bandpass filter 3 into a digital signal. The digital processing means 45 generates a control signal according to the signal from the AD converter 42. Further, by writing and storing into the memory 44 the results of signal processing by the digital processing means 45, it is possible to form the plurality of energy detection results into a database. Note that each bandwidth of the complex bandpass filter 3 and the AD converter 42 is set to a wider bandwidth compared to the configuration of the energy detection circuit shown in FIG. 4. Then, a series of input frequency and its strength are calculated by the fast Fourier transform in the digital processing means 45. While an increase in the number of points of the fast Fourier transform makes it possible to improve the detection accuracy, it also increases the size of the energy detection circuit 4. Thus, there is a trade-off relation between them.

Figure 6:
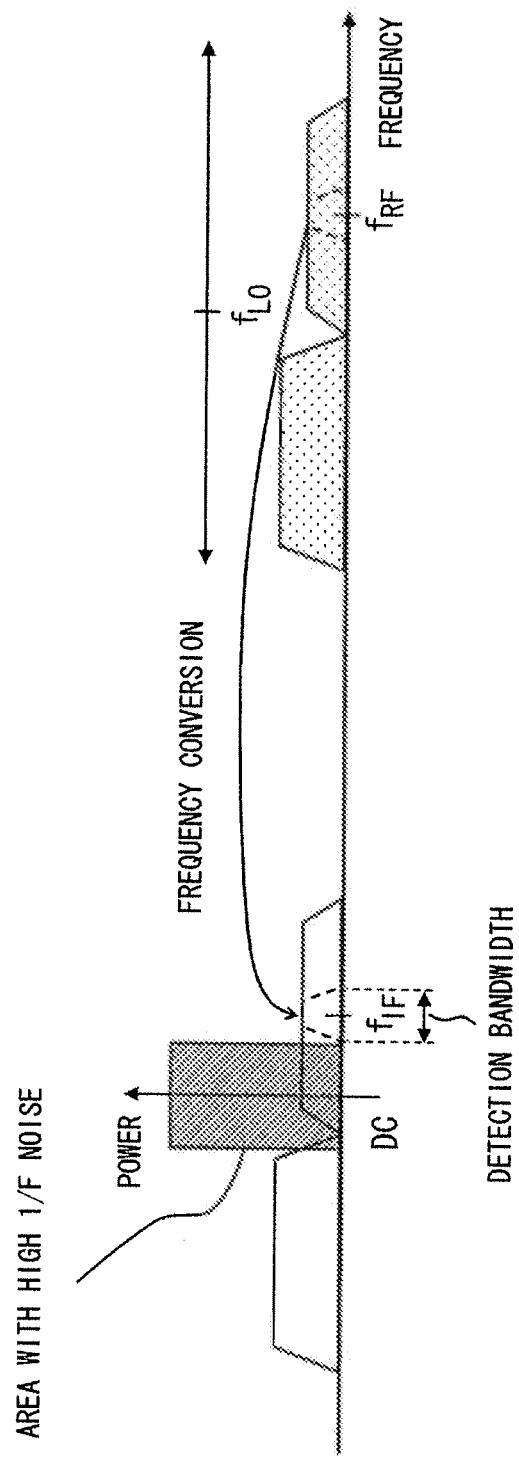
FIG. 6 is a diagram showing an operation of power detection circuits according to first to third exemplary embodiments.

Next, an operation of the power detection circuit according to the first exemplary embodiment will be described. FIG. 6 is a diagram showing an operation of the power detection circuit according to the first exemplary embodiment. First, the frequency of the variable frequency oscillator 2 is set to the LO frequency (local oscillator frequency: $f_{LO}$) in which the frequency is shifted by a frequency (IF frequency: $f_{IF}$) with respect to an RF (radio) frequency signal ($f_{RF}$) which is desired to be detected. The IF frequency ($f_{IF}$) here is from about 1 MHz to several tends of MHz, and this system is called a low IF system. Then, the mixer 1 converts the frequency of the RF frequency signal ($f_{RF}$) into a frequency around the IF frequency ($f_{IF}$). Then, the complex bandpass filter 3 removes out-of-band signals including image signals, and the energy detection circuit 4 detects power in the filter bandwidth (detection bandwidth). The image signal here is a frequency signal which has a pair relation with the RF frequency ($f_{RF}$) regarding the LO frequency ($f_{LO}$).

Note that the complex bandpass filter 3 synthesizes I/Q signals (signals having phases shifted by 0° and 90°) to remove the image signals. At this time, as shown in FIG. 6, the frequency relation is set so that the signal bandwidth which is to be detected does not enter the range with high 1/f noise. Ideally, this detection power is equal to the power around the filter bandwidth of the RF frequency ($f_{RF}$). Further, by sweeping the LO frequency ($f_{LO}$) while changing the frequency of the variable frequency oscillator 2, the power of the RF frequency ($f_{RF}$) can be detected for a wide bandwidth.

Figure 7A:
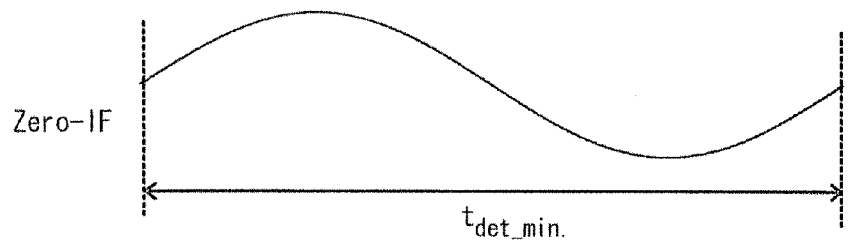
FIG. 7A is a diagram for describing an effect (high speed) of power detection circuits according to first to sixth exemplary embodiments, and shows a signal (comparative example) whose frequency is converted by a zero IF system.
Figure 7B:
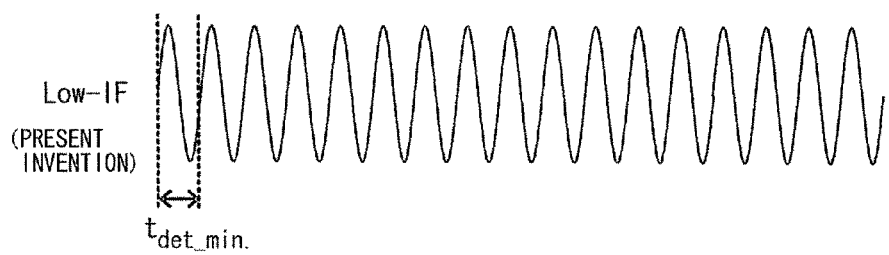
FIG. 7B shows a signal whose frequency is converted by a low IF system used in the power detection circuits according to the first to sixth exemplary embodiments.

FIGS. 7A and 7B are diagrams for describing an effect (high speed) of the power detection circuit according to the first exemplary embodiment. FIG. 7A shows, as a comparative example, a signal whose frequency is converted by a zero IF system according to the related art. Further, FIG. 7B shows a signal whose frequency is converted by the low IF system used in the power detection circuit according to the first exemplary embodiment. It is assumed here that the signals to be detected are single sine waves. As shown in FIGS. 7A and 7B, according to the comparison of these signals, when it is assumed that time required to detect the power of the energy detection circuit is one cycle ($t_{det\_min}$), the signal cycle (FIG. 7B) of the low IF system is shorter. In short, it is possible to reduce the detection time in the power detection circuit.

In the power detection circuit according to the first exemplary embodiment described above, the IF frequency ($f_{IF}$) converted by the mixer may be in a frequency range with low 1/f noise, thereby being able to detect power with high sensitivity. In short, it is possible to detect more minute power. Further, in the power detection circuit according to the first exemplary embodiment, the cycle of the IF frequency ($f_{IF}$) converted by the mixer is short, whereby it is possible to detect power at high speed (i.e., in a short period).

Figure 8:
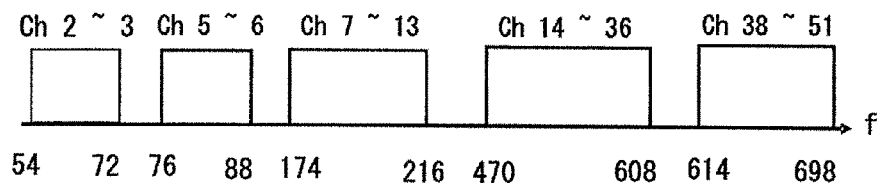
FIG. 8 is a diagram showing white space bands in the North America defined by IEEE802.22.

The power detection circuit described above can be used for a cognitive radio represented by IEEESCC41 or IEEE802.22 using idler frequencies of televisions, for example. For example, as shown in FIG. 8, the usage of bands of digital TVs from about 50 MHz to 700 MHz is allowed in the North America. It is required in the cognitive radio to judge whether the frequency is used by performing detection of extremely minute power called spectrum sensing.

For example, according to IEEE802.22, the detection accuracy is −116-dBm or lower in the bandwidth of 6 MHz for each channel. In order to perform spectrum sensing on such extremely small power for a wide bandwidth, a two-stage sensing method may be used, for example. Specifically, energy detection (or blind detection) is performed at the first stage which can perform detection at high speed while detection sensitivity is rather low. Then, at the second stage, feature detection is performed which can perform detection with high accuracy. The latter feature detection can be achieved by digital processing, for example, which has a large scale and requires a long time.

Second Exemplary Embodiment

Figure 9:
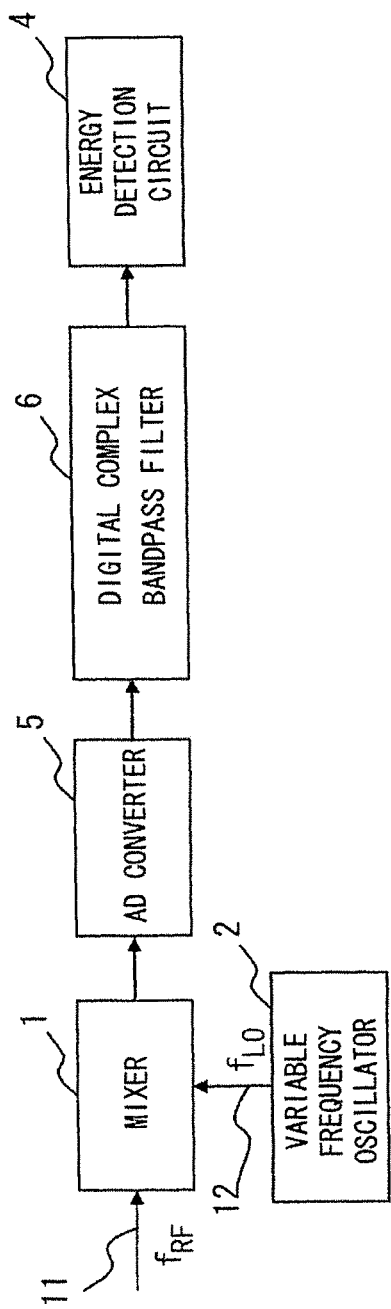
FIG. 9 is a block diagram showing the power detection circuit according to the second exemplary embodiment.

Next, a power detection circuit according to a second exemplary embodiment of the present invention will be described. FIG. 9 is a block diagram showing the power detection circuit according to the second exemplary embodiment. The power detection circuit according to the second exemplary embodiment includes a mixer 1, a variable frequency oscillator 2, an AD converter 5, a digital complex bandpass filter 6, and an energy detection circuit 4. That is, the power detection circuit according to the second exemplary embodiment includes the AD converter 5 and the digital complex bandpass filter 6 in place of the complex bandpass filter 3 according to the first exemplary embodiment. Other components are similar to those in the power detection circuit according to the first exemplary embodiment, and thus overlapping description will be omitted.

Next, an operation of the power detection circuit according to the second exemplary embodiment will be described. The operation according to the second exemplary embodiment will be described with reference to FIG. 6, as is similar to the first exemplary embodiment. First, the frequency of the variable frequency oscillator 2 is set to the LO frequency (local oscillator frequency: $f_{LO}$) in which the frequency is shifted by the frequency (IF frequency: $f_{IF}$) with respect to the RF (radio) frequency signal ($f_{RF}$) which is desired to be detected. The IF frequency ($f_{IF}$) here is from about 1 MHz to several tens of MHz, and this system is called a low IF system. Then, the mixer 1 converts the frequency of the RF frequency signal ($f_{RF}$) into a frequency around the IF frequency ($f_{IF}$).

Then, after the digital signal is produced by the AD converter 5, out-of-band signals including image signals are removed by the digital complex bandpass filter 6, and the power in the filter bandwidth (detection bandwidth) is detected using the energy detection circuit 4. At this time, the frequency relation is set so that the signal bandwidth which is to be detected does enter the range with high 1/f noise. Further, by sweeping the LO frequency ($f_{LO}$) while changing the frequency of the variable frequency oscillator 2, the power of the RF frequency ($f_{RF}$) can be detected for a wide bandwidth.

According to such a configuration, in addition to the effect in the first exemplary embodiment, it is possible to easily obtain a filter with high performance and large scale since it is possible to use the digital complex bandpass filter 6. Further, along with miniaturization of the CMOS process, it is possible to reduce the size and the power of the filter.

Third Exemplary Embodiment

Figure 10:
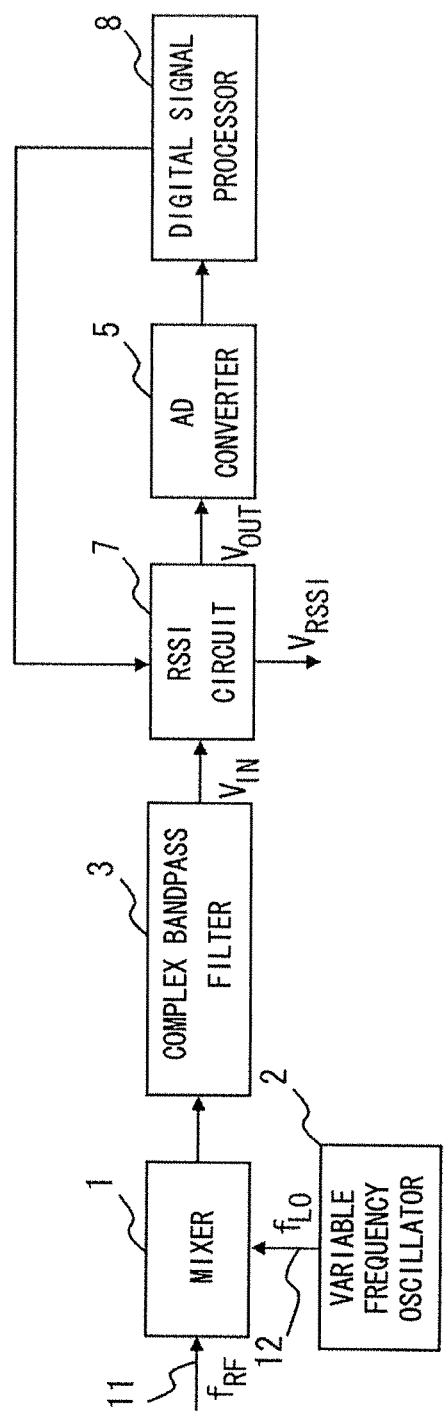
FIG. 10 is a block diagram showing the power detection circuit according to the third exemplary embodiment.

Next, a power detection circuit according to a third exemplary embodiment of the present invention will be described. FIG. 10 is a block diagram showing the power detection circuit according to the third exemplary embodiment. The power detection circuit according to the third exemplary embodiment includes a mixer 1, a variable frequency oscillator 2, a complex bandpass filter 3, an RSSI circuit (Received Signal Strength Indicator) 7, an AD converter 5, and a digital signal processor (DSP) 8.

Figure 11:
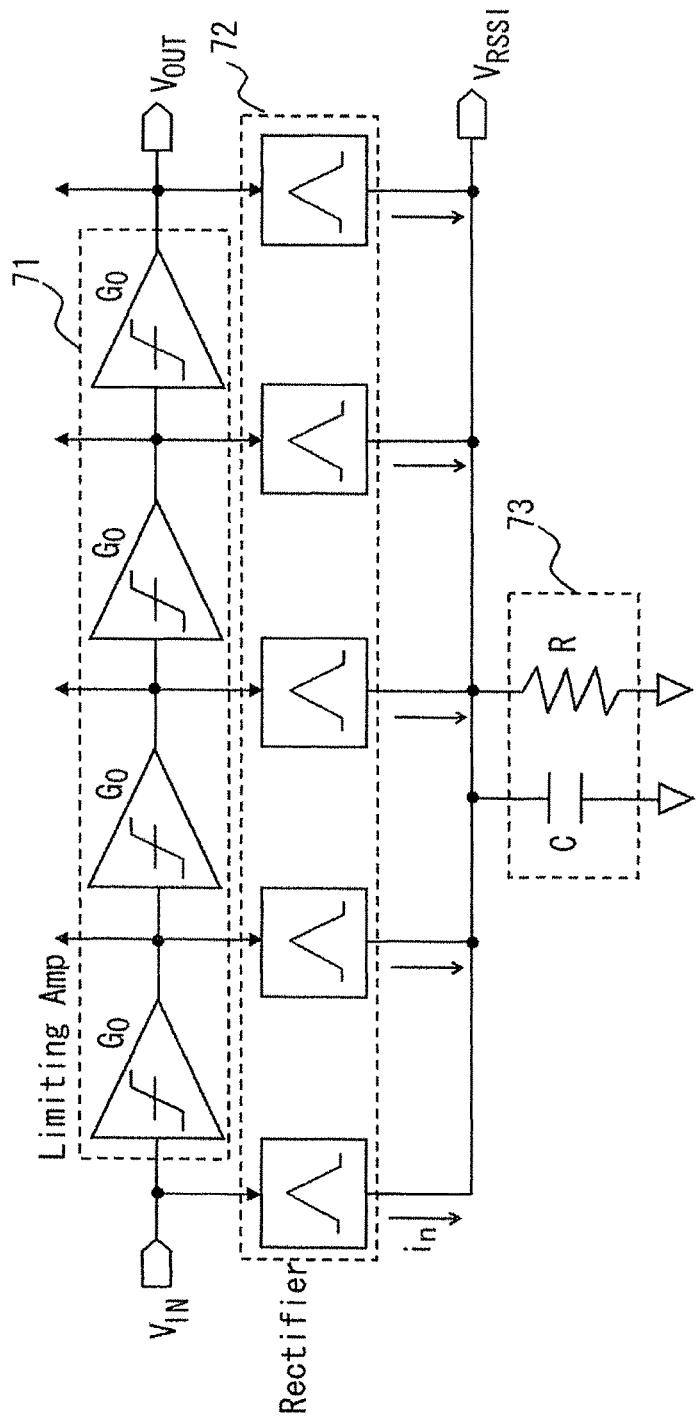
FIG. 11 is a diagram showing one example of an RSSI circuit used in the power detection circuit according to the third exemplary embodiment.

FIG. 11 is a diagram showing one example of the RSSI circuit 7. In the RSSI circuit shown in FIG. 11, a detection signal ($V_{IN}$) is amplified by an amplifier group 71 dependently connected in multiple stages. An output signal ($V_{OUT}$) is output from the final stage of the amplifier group 71. Further, rectifiers 72 are connected between the respective stages, and a current ($i_n$) according to the amplitude of the output of the amplifier is output from each of the rectifiers 72. For example, larger current flows with decreasing amplitude. On the other hand, the current does not flow when the amplitude exceeds a certain level.

Further, the RSSI circuit shown in FIG. 11 includes a current-voltage conversion circuit 73 including a resistor R and a capacitor C to convert the current in each of the rectifiers 72 to the voltage and to make variations of the voltage smooth. According to such an RSSI circuit, an output voltage ($V_{RSSI}$) is output with a relation of logarithm with respect to the detection signal ($V_{IN}$). This output voltage ($V_{RSSI}$) is output to the AD converter 5. Accordingly, it is possible to obtain a wide dynamic range with high sensitivity compared to a linear power detection circuit.

The low IF system applied in the power detection circuit according to the third exemplary embodiment has high input signal frequency compared to the zero IF system. Accordingly, values of a capacity for AC coupling for DC offset cancelling and a capacity of the current-voltage conversion circuit can be decreased, thereby reducing the size of the area. The DC offset cancelling here is means for suppressing reduction of a dynamic range due to the shift of a threshold of a MOS transistor of a di ial input stage of an amplifier.

Next, an operation of the power detection circuit according to the third exemplary embodiment will be described. The power detection circuit according to the third exemplary embodiment uses an RSSI circuit as the energy detection circuit 4 used in the power detection circuits according to the first and second exemplary embodiments. Other configurations are similar to the cases in the first and second exemplary embodiments. The RSSI circuit here is also used at the time of the reception operation. The detection signal ($V_{IN}$) input to the RSSI circuit 7 is amplified by the amplifier group 71. Further, the output voltage ($V_{RSSI}$) is converted into the digital signal by the AD converter 5. Further, the digital signal is demodulated using the digital signal processor (DSP) 8.

Figure 12:
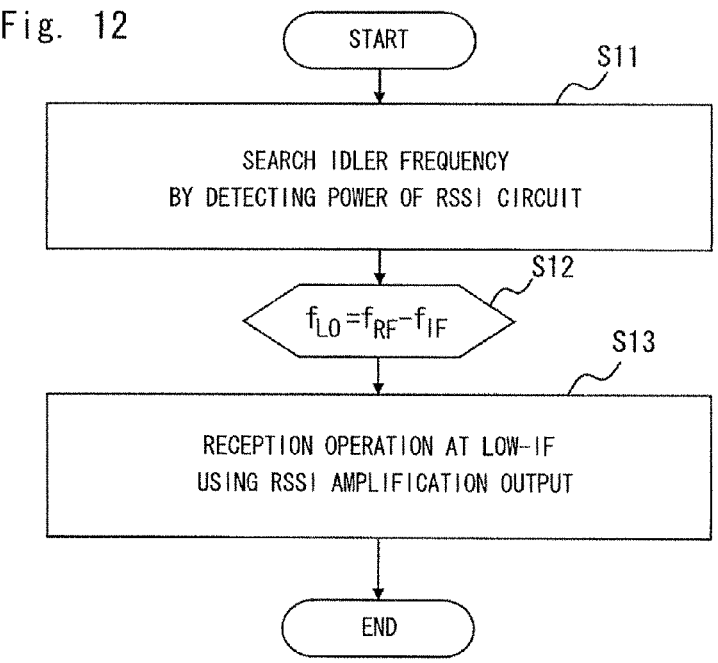
FIG. 12 is a flowchart showing an operation of the power detection circuits according to the third and sixth exemplary embodiments.

FIG. 12 is a flowchart showing an operation of the power detection circuit according to the third exemplary embodiment. First, the idler frequency is searched using the RSSI circuit 7 as the energy detection circuit (Step S11). When the idler frequency is found, the oscillator frequency is set to the LO frequency ($f_{LO}=f_{RF}-f_{IF}$) which is shifted from the frequency ($f_{RF}$) by the IF frequency ($f_{IF}$) (Step S12). Then, the reception operation is started at the low IF using the amplifier group 71 of the RSSI circuit 7 as the amplification stages of the receiver (Step S13). At this time, by switching the number of output stages of the RSSI circuit (i.e., selecting whether the first stage is taken or the second stage is taken, and the like), it may be used as a VGA (variable gain amplifier) at the reception operation.

Further, when an amplifier which can finely adjust gain is arranged in the RSSI output, it can be used as a VGA with high resolution in a wide range. This VGA can be switched by AGC (automatic gain control) according to the intensity of the antenna input signal. In this way, by using the RSSI circuit 7 both in the energy detection circuit and the VGA circuit, it is possible to reduce area overhead that is required to detect power.

Fourth Exemplary Embodiment

Figure 13:
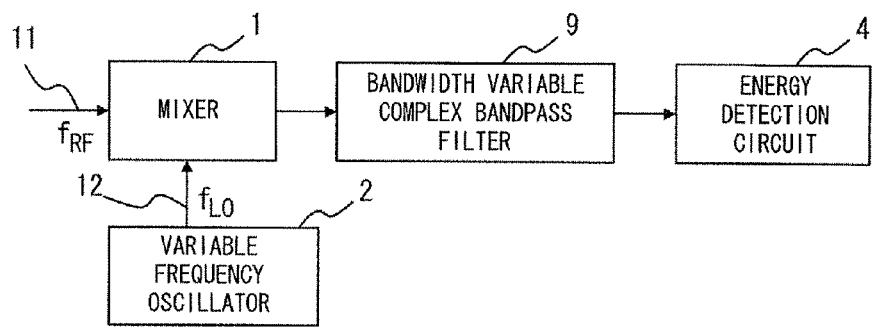
FIG. 13 is a block diagram showing the power detection circuit according to the fourth exemplary embodiment.

Next, a power detection circuit according to a fourth exemplary embodiment of the present invention will be described. FIG. 13 is a block diagram showing the power detection circuit according to the fourth exemplary embodiment. The power detection circuit according to the fourth exemplary embodiment includes a mixer 1, a variable frequency oscillator 2, a bandwidth variable complex bandpass filter 9, and an energy detection circuit 4. That is, the power detection circuit according to the fourth exemplary embodiment includes the bandwidth variable complex bandpass filter 9 in place of the complex bandpass filter 3 according to the first exemplary embodiment. Other components are similar to those in the power detection circuit according to the first exemplary embodiment, and thus overlapping description will be omitted.

Figure 14:
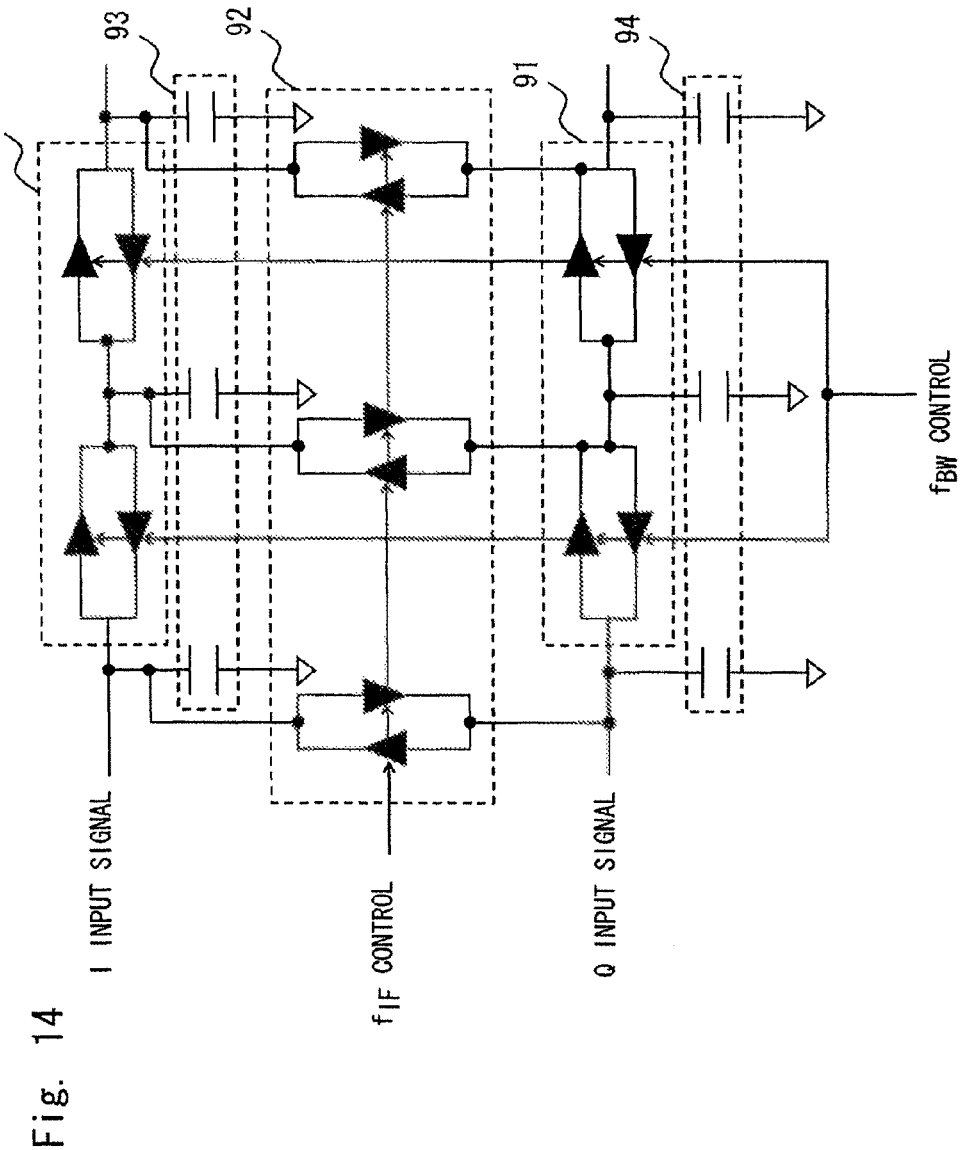
FIG. 14 is a circuit diagram showing one example of a bandwidth variable complex bandpass filter used in the power detection circuit according to the present invention.

FIG. 14 is a circuit diagram showing one example of the bandwidth variable complex bandpass filter 9. The bandwidth variable complex bandpass filter 9 shown in FIG. 14 includes a first variable gm cell group 90 connected to a main path to which an I input signal of I/Q signals is input, a second variable gm cell group 91 connected to a main path to which a Q input signal is input, a third variable gm cell group 92 connected between the main path of the first variable gm cell group 90 and the main path of the second variable gm cell group 91, a first capacitance group 93, and a second capacitance group 94.

Each capacitance element forming the first capacitance group 93 has one end connected to the corresponding gm cell of the first variable gm cell group 90 and the corresponding gm cell of the third variable gm cell group 92, and the other end connected to a reference power supply. Each capacitance element forming the second capacitance group 94 has one end connected to the corresponding gm cell of the second variable gm cell group 91 and the corresponding gm cell of the third variable gm cell group 92, and the other end connected to the reference power supply. Each gm cell may be achieved by a linear region operation of a transistor, for example.

Further, the gm value of each gm cell of the first variable gm cell group 90 and the second variable gm cell group 91 may be adjusted by an $f_{BW}$ control signal. Further, the gm value of each gm cell of the third variable gm cell group 92 may be adjusted by an $f_{IF}$ control signal.

Therefore, in the bandwidth variable complex bandpass filter 9 shown in FIG. 14, the bandwidth ($f_{BW}$) of the filter can be switched by adjusting the gm value of each gm cell of the first variable gm cell group 90 and the second variable gm cell group 91. On the other hand, it is possible to switch the center frequency (i.e., IF frequency ($f_{IF}$)) of the filter by adjusting the gm value of each gm cell of the third variable gm cell group 92. If any means to switch the parallel number of the unit gm cells that are connected in parallel is used, for example, when these gm cells are made variable, adjustment of the gm values may be achieved with high accuracy in a simple manner.

Figure 15:
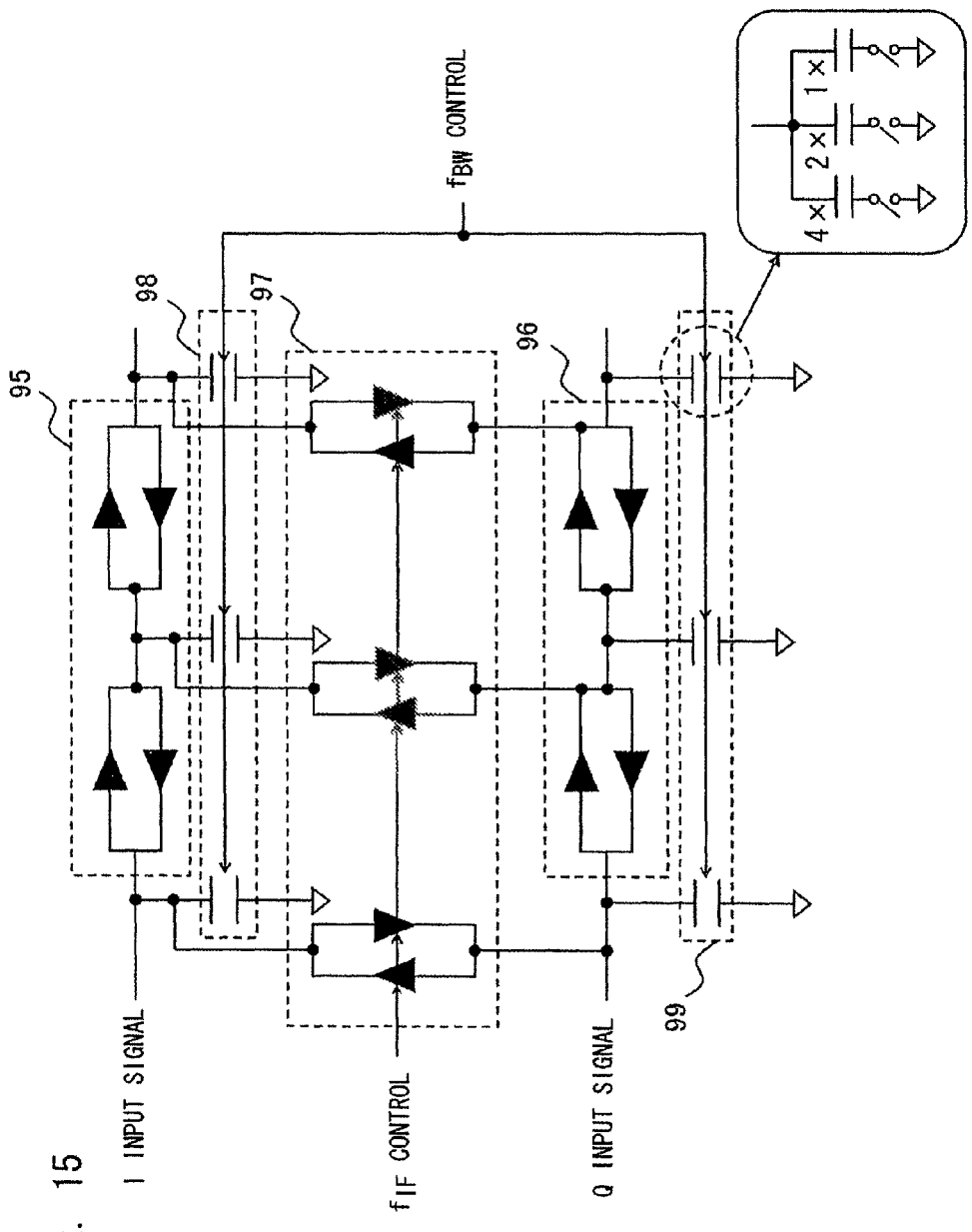
FIG. 15 is a circuit diagram showing another example of the bandwidth variable complex bandpass filter used in the power detection circuit according to the present invention.

FIG. 15 is a circuit diagram showing another example of the bandwidth variable complex bandpass filter 9. The bandwidth variable complex bandpass filter 9 shown in FIG. 15 includes a first gm cell group 95 connected to a main path to which an I input signal of I/Q signals is input, a second gm cell group 96 connected to a main path to which a Q input signal is input, a third variable gm cell group 97 connected between the main path of the first gm cell group 95 and the main path of the second gm cell group 96, a first variable capacity group 98, and a second variable capacity group 99.

Each capacitance element forming the first variable capacity group 98 has one end connected to the corresponding gm cell of the first gm cell group 95 and the corresponding gin cell of the third variable gm cell group 97, and the other end connected to the reference power supply. Each capacitance element forming the second variable capacity group 99 has one end connected to the corresponding gm cell of the second gm cell group 96 and the corresponding gm cell of the third variable gm cell group 97, and the other end connected to the reference power supply. Each gin cell may be achieved by a linear region operation of a transistor, for example. Further, the gm value of each gm cell of the third variable gin cell group 97 may be adjusted by an $f_{IF}$ control signal.

Further, the capacity of each capacitance element forming the first variable capacity group 98 and the capacity of each capacitance element forming the second variable capacity group 99 can be adjusted by an $f_{BW}$ control signal. The capacity of each capacitance element may be adjusted with high accuracy in a simple manner by switching a plurality of capacitors connected in parallel and binary weighted by switches, as shown in FIG. 15, for example.

In the bandwidth variable complex bandpass filter 9 shown in FIG. 15, the bandwidth ($f_{BW}$) of the filter may be switched by adjusting the capacity of each of the capacitance elements of the first and second variable capacity groups 98 and 99. On the other hand, the center frequency of the filter (i.e., IF frequency ($f_{IF}$)) can be switched by adjusting the gm values of the third variable gm cell group 97.

Figure 16A:
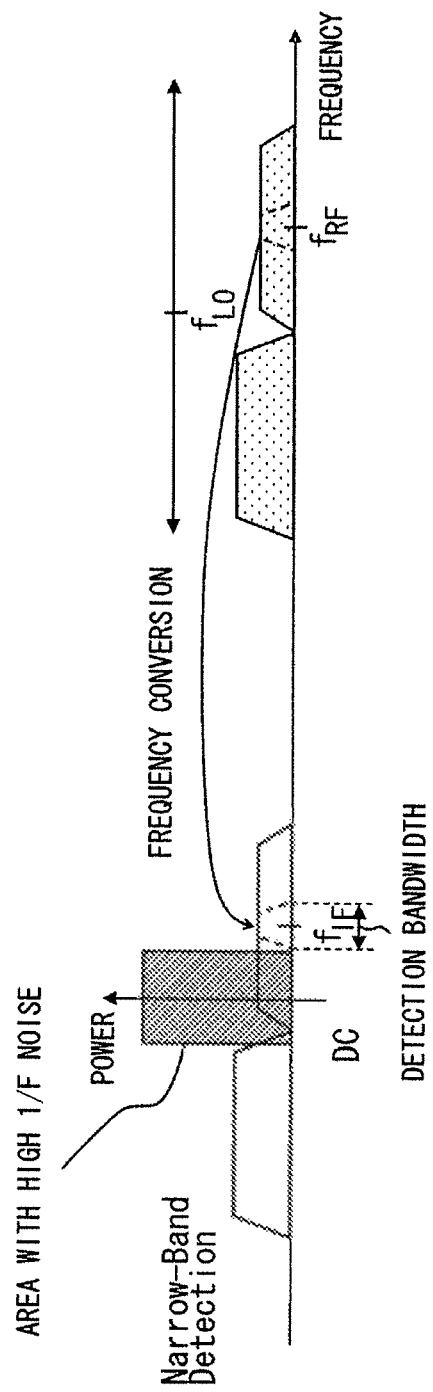
FIG. 16A is a diagram showing an operation of the power detection circuits according to the fourth to sixth exemplary embodiments (power detection in a narrow bandwidth)
Figure 16B:
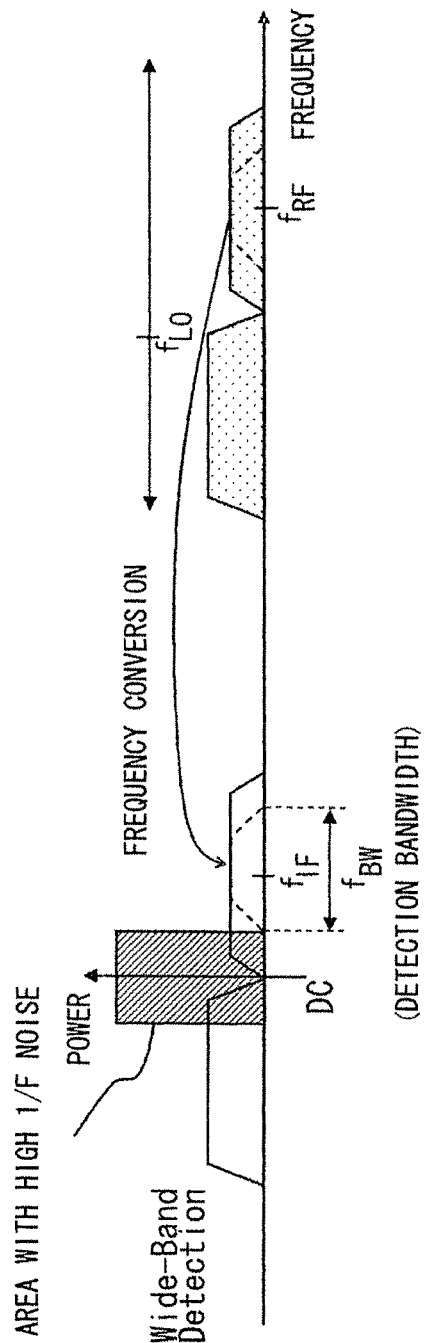
FIG. 16B is a diagram showing an operation of the power detection circuits according to the fourth to sixth exemplary embodiments (power detection in a wide bandwidth)

Next, an operation of the power detection circuit according to the fourth exemplary embodiment will be described. FIGS. 16A and 16B are diagrams each showing an operation of the power detection circuit according to the fourth exemplary embodiment. The operation of the power detection circuit according to the fourth exemplary embodiment is greatly different from the power detection circuits according to the first to third exemplary embodiments in that the bandwidth to detect power is switched.

There is a trade-off relation between sensitivity and time in the power detection in a narrow bandwidth and the power detection in a wide bandwidth. For example, while the power detection in a narrow bandwidth has high sensitivity, it requires long detection time. In order to solve this problem, the power detection circuit according to the fourth exemplary embodiment detects power while appropriately changing the bandwidth (e.g., power is first detected roughly in a wide bandwidth, and then detected finely in a narrow bandwidth), thereby being able to improve the trade-off relation.

In the case of the power detection in a narrow bandwidth, as is similar to the power detection circuits in the first to third exemplary embodiments, the LO frequency ($f_{LO}$) of the variable frequency oscillator 2 is selected so that the bandwidth ($f_{RF}$) which is desired to be detected, the frequency of the bandwidth being converted by the mixer 1, is not in the frequency range with high 1/f noise (FIG. 16A). Next, when power is detected in a wide bandwidth at the same RF frequency ($f_{RF}$), the bandwidth ($f_{BW}$) of the bandwidth variable complex bandpass filter 9 is widened, and the LO frequency ($f_{LO}$) of the variable frequency oscillator 2 is selected so that the bandwidth (i.e., $f_{BW}$) which is desired to be detected, the frequency of the bandwidth being converted by the mixer 1, is not in the frequency range with high 1/f noise (FIG. 16B). According to such a configuration, it is possible to detect the bandwidth variable power with high sensitivity.

Figure 17A:
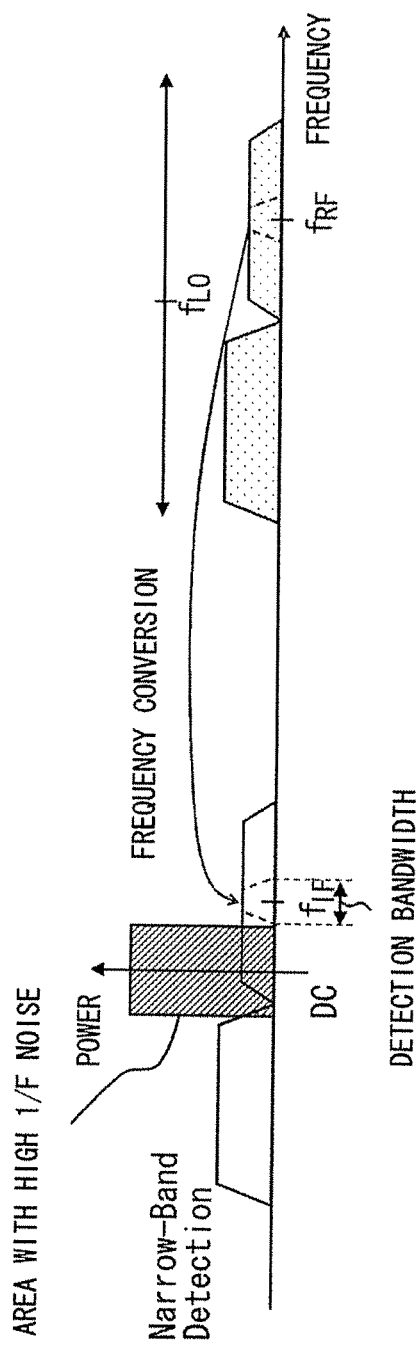
FIG. 17A is a diagram showing an operation of the power detection circuits according to the fourth to sixth exemplary embodiments (power detection in a narrow bandwidth)
Figure 17B:
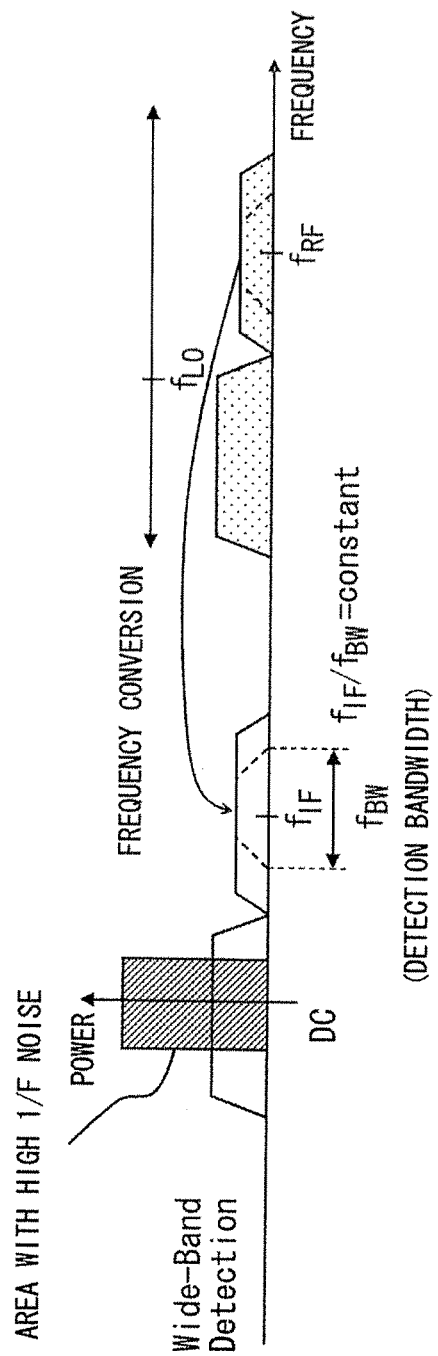
FIG. 17B is a diagram showing an operation of the power detection circuits according to the fourth to sixth exemplary embodiments (power detection in a wide bandwidth)

FIGS. 17A and 17B are diagrams showing another operation of the power detection circuit according to the fourth exemplary embodiment. The operation of the power detection circuit shown in FIGS. 17A and 17B is similar to the operation shown in FIGS. 16A and 16B in that the LO frequency ($f_{LO}$) of the variable frequency oscillator 2 is set so that the bandwidth which is desired to be detected, the frequency of the bandwidth being converted by the mixer, is not in the frequency range with high 1/f noise even when the bandwidth of the filter is changed.

However, the operation of the power detection circuit shown in FIGS. 17A and 17B is different from the operation of FIGS. 16A and 16B in that it changes the bandwidth of the filter($f_{BW}$) and the LO frequency ($f_{IF}$) while maintaining a constant ratio of the IF frequency ($f_{IF}$) to the filter bandwidth ($f_{BW}$). Such an operation makes it easy to achieve the means for adjusting the bandwidth variable complex bandpass filter 9. For example, when the bandwidth of the filter is doubled, the gms of the first and second variable gm cell groups 90 and 91, and the gms of the third variable gm cell group 92 of the bandwidth variable complex bandpass filter shown in FIG. 14 may be doubled. On the other hand, also in the configuration of the bandwidth variable complex bandpass filter shown in FIG. 15, the capacities of the first and second variable capacity groups 98 and 99, and the gms of the third variable gm cell group 97 may be doubled. Accordingly, the use of the bandwidth variable complex bandpass filter 9 eliminates the need for a look-up table and complex calculation processing.

Figure 18A:
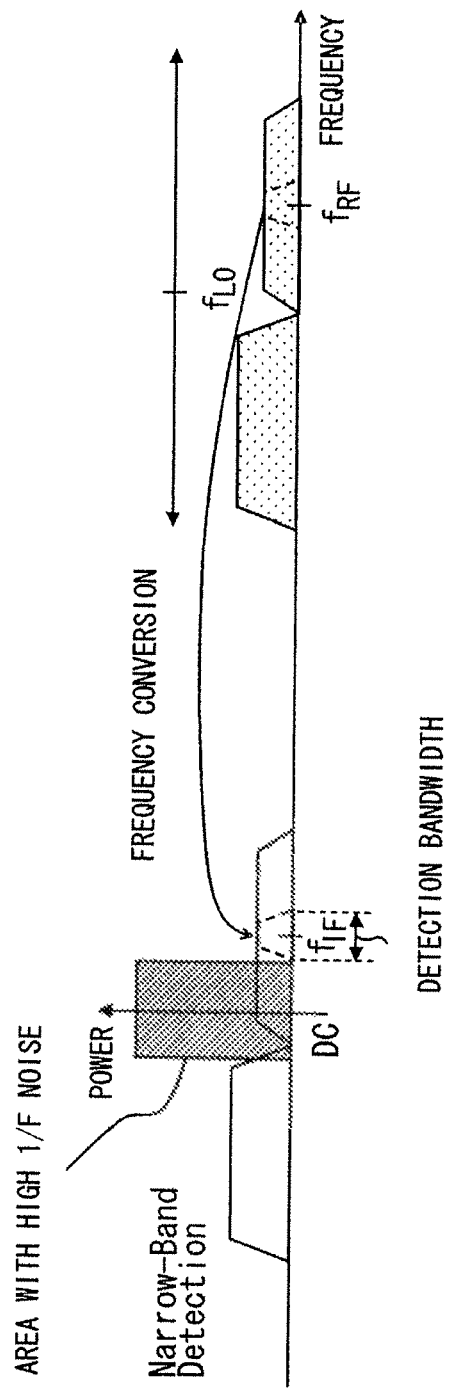
FIG. 18A is a diagram showing an operation of the power detection circuits according to the fourth to sixth exemplary embodiments (power detection in a narrow bandwidth)
Figure 18B:
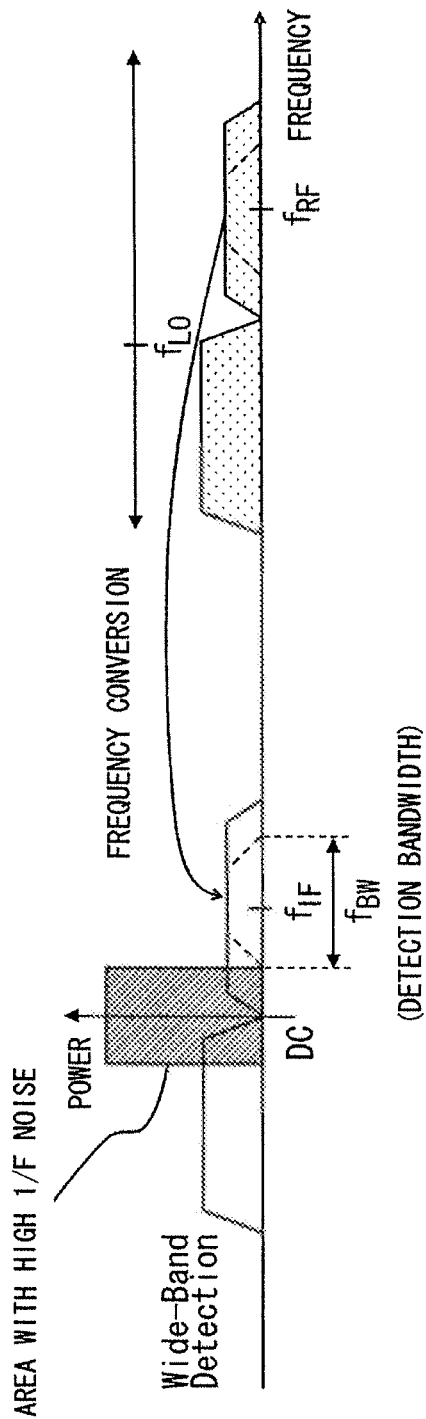
FIG. 18B is a diagram showing an operation of the power detection circuits according to the fourth to sixth exemplary embodiments (power detection in a wide bandwidth)
Figure 18C:
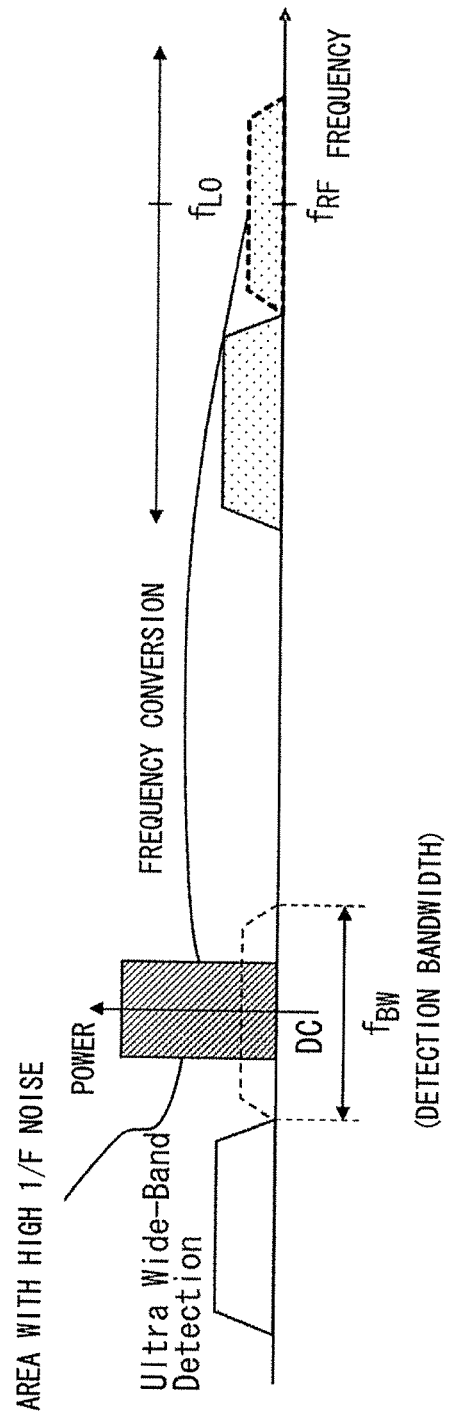
FIG. 18C is a diagram showing an operation of the power detection circuits according to the fourth to sixth exemplary embodiments (power detection in an ultra wide bandwidth).

FIGS. 18A-18C are diagrams showing another operation of the power detection circuit according to the fourth exemplary embodiment. The case of the power detection in a narrow bandwidth shown in FIG. 18A and the case of the power detection in a wide bandwidth shown in FIG. 18B are similar to the cases of FIGS. 16 and 17 described above. Meanwhile, in the case of the power detection in an ultra wide bandwidth (i.e., a case in which power is detected in a bandwidth equal to or larger than a frequency range with high 1/f noise), the LO frequency ($f_{LO}$) is set to be equal to the RF frequency ($f_{RF}$) (i.e., zero IF) to detect power. Accordingly, the IF frequency increases as well as the detection bandwidth, thereby being able to avoid the problem that the power and the area of the circuits subsequent to the bandwidth variable complex bandpass filter are increased.

Fifth Exemplary Embodiment

Figure 19:
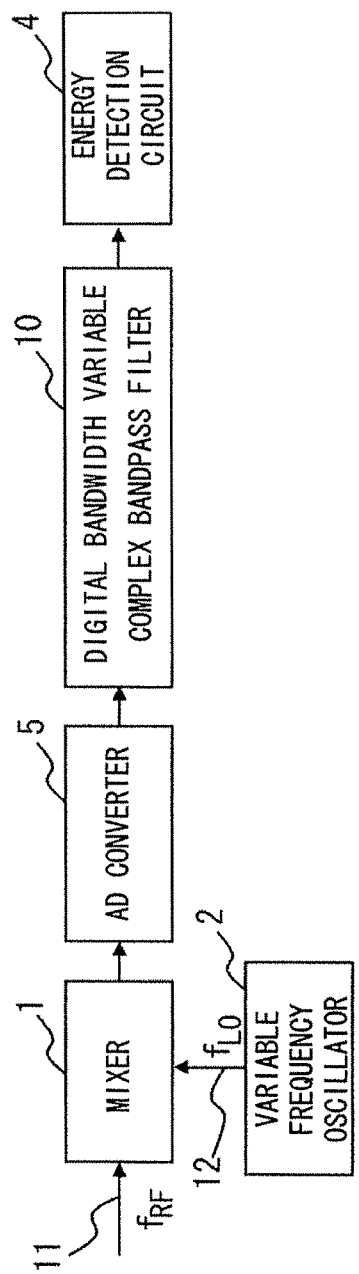
FIG. 19 is a block diagram showing the power detection circuit according to the fifth exemplary embodiment.

Next, a power detection circuit according to a fifth exemplary embodiment of the present invention will be described. FIG. 19 is a block diagram showing the power detection circuit according to the fifth exemplary embodiment. The power detection circuit according to the fifth exemplary embodiment includes a mixer 1, a variable frequency oscillator 2, an AD converter 5, a digital bandwidth variable complex bandpass filter 10, and an energy detection circuit 4. The power detection circuit according to the fifth exemplary embodiment is obtained by combining the power detection circuit according to the second exemplary embodiment (see FIG. 9) and the power detection circuit according to the fourth exemplary embodiment (see FIG. 13).

That is, the power detection circuit according to the fifth exemplary embodiment includes the AD converter 5 that converts an analog signal into a digital signal. The AD converter 5 is provided subsequent to the mixer 1 as is similar to the power detection circuit according to the second exemplary embodiment. Further, as is similar to the power detection circuit according to the fourth exemplary embodiment, the bandwidth variable complex bandpass filter is provided subsequent to the AD converter 5 as is similar to the power detection circuit according to the fourth exemplary embodiment. In this case, the bandwidth variable bandpass filter uses the digital bandwidth variable complex bandpass filter 10 so as to correspond to the digital signal converted by the AD converter 5.

Other components are similar to those in the power detection circuit according to the second and fourth exemplary embodiments, and thus overlapping description will be omitted. The power detection circuit according to the fifth exemplary embodiment is also able to achieve the similar effects as in the second and fourth exemplary embodiments.

Sixth Exemplary Embodiment

Figure 20:
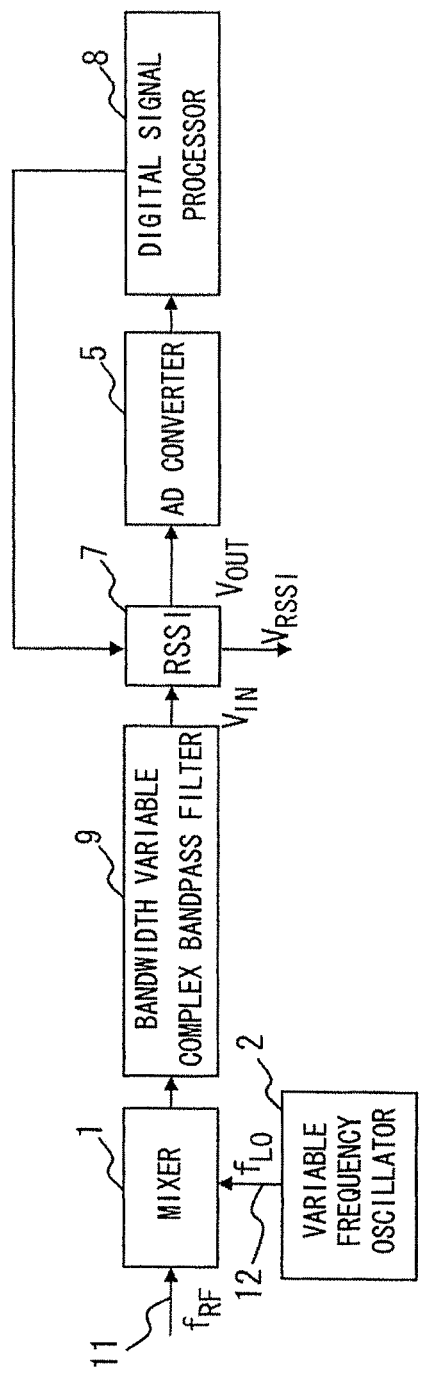
FIG. 20 is a block diagram showing the power detection circuit according to the sixth exemplary embodiment.

Next, a power detection circuit according to a sixth exemplary embodiment of the present invention will be described. FIG. 20 is a block diagram showing the power detection circuit according to the sixth exemplary embodiment of the present invention. The power detection circuit according to the sixth exemplary embodiment includes a mixer 1, a variable frequency oscillator 2, a bandwidth variable complex bandpass filter 9, an RSSI circuit 7, an AD converter 5, and a digital signal processor (DSP) 8. The power detection circuit according to the sixth exemplary embodiment is obtained by combining the power detection circuit according to the third exemplary embodiment (see FIG. 10) and the power detection circuit according to the fourth exemplary embodiment (see FIG. 13).

In short, in the power detection circuit according to the sixth exemplary embodiment, the complex bandpass filter 3 used in the power detection circuit according to the third exemplary embodiment is replaced with the bandwidth variable complex bandpass filter 9 used in the fourth exemplary embodiment.

Figure 21:
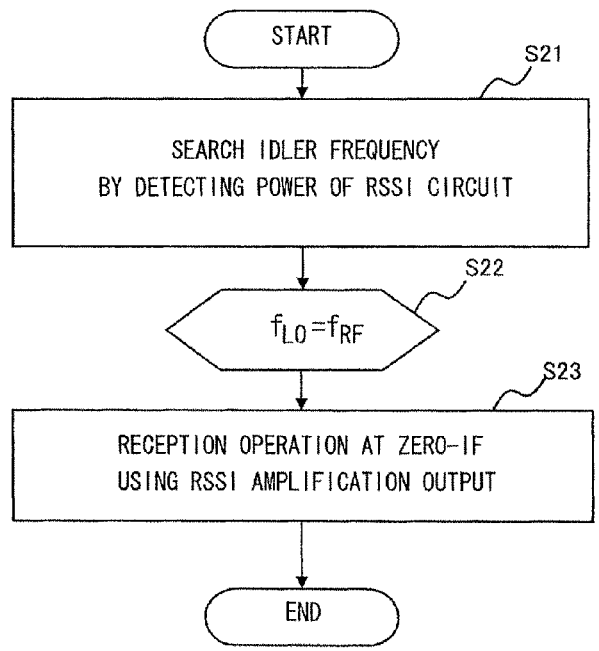
FIG. 21 is a flowchart showing an operation of the power detection circuits according to the third and sixth exemplary embodiments.
Figure 22:
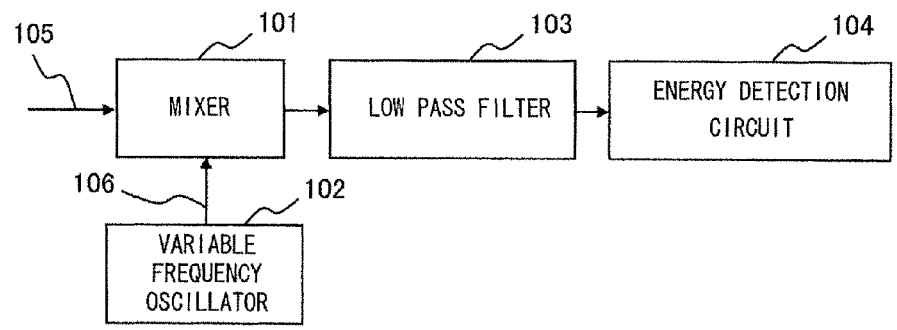
FIG. 22 is a block diagram showing a power detection circuit according to a related art.
Figure 23:
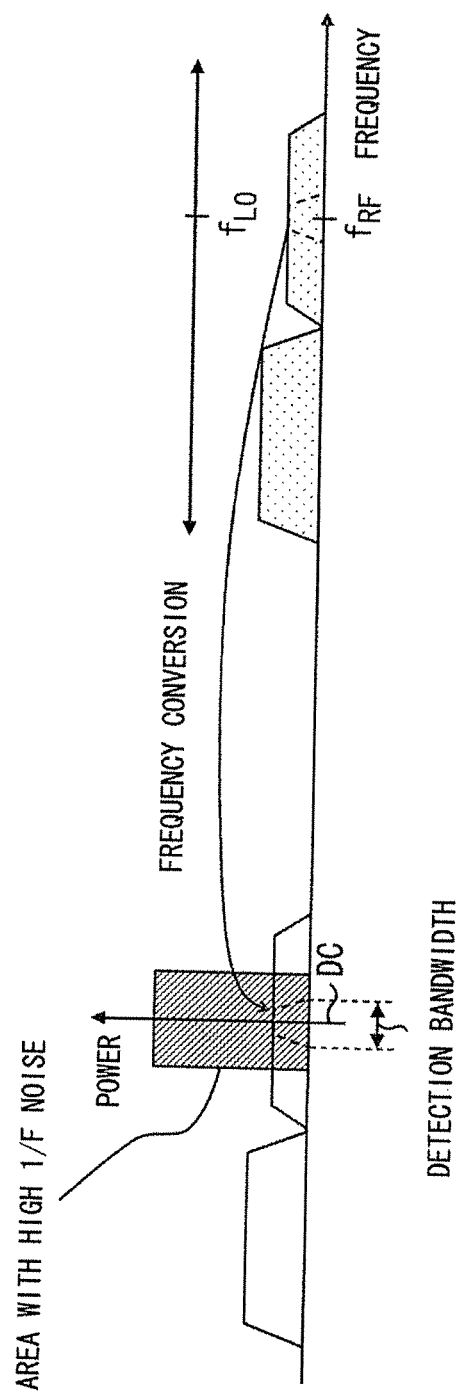
FIG. 23 is a diagram showing an operation of the power detection circuit according to the related art.

FIG. 21 is a flowchart showing an operation of the power detection circuit according to the sixth exemplary embodiment. As shown in FIG. 21, first, idler frequency search is performed using the RSSI circuit 7 as the energy detection circuit (Step S21). When the idler frequency is found, the frequency is set to the LO frequency ($f_{LO}$) which is equal to the RF frequency ($f_{RF}$) (Step S22). Then, the reception operation is started at the zero IF using the amplifier group 71 of the RSSI circuit 7 as an amplification stage of the receiver (Step S23).

The difference from the operation shown in FIG. 12 described in the third exemplary embodiment is that the frequency is set to the LO frequency ($f_{LO}$) which is equal to the RF frequency ($f_{RF}$) of the idler frequency at the reception operation (i.e., zero IF). In this case, it is possible to reduce the influence of the interfering wave of the image signal frequency compared to the case in which the reception operation is performed at the low IF described with reference to FIG. 12. In other words, the low IF system is weak to the strong interfering wave of the image signal frequency compared to the zero IF system.

Other components are similar to those in the power detection circuits according to the third and fourth exemplary embodiments, and thus overlapping description will be omitted. The power detection circuit according to the sixth exemplary embodiment is also able to achieve the similar effects as in the third and fourth exemplary embodiments.

While the present invention has been described with reference to the exemplary embodiments, the present invention is not limited to the description above. Various changes that can be understood by a person skilled in the art within the scope of the present invention may be made to the configuration and the detail of the present invention.

This application claims the benefit of priority, and incorporates herein by reference in its entirety, the following Japanese Patent Application No. 2010-060294 filed on Mar. 17, 2010.

REFERENCE SIGNS LIST

1 MIXER
2 VARIABLE FREQUENCY OSCILLATOR
3 COMPLEX BANDPASS FILTER
4 ENERGY DETECTION CIRCUIT
5 AD CONVERTER
6 DIGITAL COMPLEX BANDPASS FILTER
7 RSSI CIRCUIT
8 DIGITAL SIGNAL PROCESSOR
9 BANDWIDTH VARIABLE COMPLEX BANDPASS FILTER
10 DIGITAL BANDWIDTH VARIABLE COMPLEX BANDPASS FILTER

The invention claimed is:

1. A power detection circuit comprising:
a variable frequency oscillator for oscillating a local oscillator frequency;
a mixer for receiving the local oscillator frequency and a detection signal and converting a frequency of the detection signal using the local oscillator frequency;
a complex bandpass filter for limiting a bandwidth of the detection signal whose frequency is converted to a predetermined detection bandwidth; and
an energy detection circuit for detecting power of the predetermined detection bandwidth based on an output from the complex bandpass filter,
wherein the local oscillator frequency is set so that the predetermined detection bandwidth of the detection signal whose frequency is converted is in a frequency range having low 1/f noise,
wherein the predetermined detection bandwidth of the complex bandpass filter is variable, and
wherein when the predetermined detection bandwidth of the complex bandpass filter is wider than a frequency range with high 1/f noise, the local oscillator frequency is set so that a central frequency of the detection signal whose frequency is converted is Direct Current (DC).

2. The power detection circuit according to claim 1, wherein the variable frequency oscillator sweeps the local oscillator frequency.

3. The power detection circuit according to claim 2,
wherein the power detection circuit further comprises an AD converter for converting the detection signal whose frequency is converted to a digital signal, the detection signal being output from the mixer, and
wherein the complex bandpass filter comprises a digital complex bandpass filter for limiting the bandwidth of the detection signal converted into the digital signal to the predetermined detection bandwidth.

4. The power detection circuit according to claim 2, wherein the energy detection circuit comprises a Received Signal Strength Indicator (RSSI) circuit.

5. The power detection circuit according to claim 1,
wherein the power detection circuit further comprises an AD converter for converting the detection signal whose frequency is converted to a digital signal, the detection signal being output from the mixer, and
wherein the complex bandpass filter comprises a digital complex bandpass filter for limiting the bandwidth of the detection signal converted into the digital signal to the predetermined detection bandwidth.

6. The power detection circuit according to claim 1, wherein the energy detection circuit comprises a Received Signal Strength Indicator (RSSI) circuit.

7. The power detection circuit according to claim 6, wherein the RSSI circuit comprises:
a plurality of amplifiers dependently connected in multiple stages;
a plurality of rectifiers connected between respective stages of the plurality of amplifiers; and
a current-voltage conversion circuit for converting a current output from each of the plurality of rectifiers to a voltage.

8. The power detection circuit according to claim 7, wherein the RSSI circuit is used as a variable gain amplifier at a reception time by switching a number of output stages of the plurality of amplifiers that are dependently connected in multiple stages.

9. The power detection circuit according to claim 1, wherein, when the predetermined detection bandwidth of the bandpass filter is changed, a ratio of the predetermined detection bandwidth of the complex bandpass filter to a center frequency of the complex bandpass filter is made constant.

10. The power detection circuit according to claim 1, wherein said energy detection circuit generates a control signal depending on a plurality of energy detection results.

11. The power detection circuit according to claim 1, wherein said complex bandpass filter removes one or more out-of-band signals from said detection signal.

12. The power detection circuit according to claim 11, wherein said one or more out-of-band signals includes an image signal.

13. A power detection method comprising:
setting a local oscillator frequency;
converting a frequency of a detection signal using the local oscillator frequency;
limiting a bandwidth of a converted detection signal to a predetermined detection bandwidth by using a complex bandpass filter;
detecting a power of the predetermined detection bandwidth of the converted detection signal; and
setting the local oscillator frequency so that the predetermined detection bandwidth of the converted detection signal is in a frequency range having low 1/f noise when setting the local oscillator frequency,
wherein the predetermined detection bandwidth of the complex bandpass filter is variable, and
wherein when the predetermined detection bandwidth of the complex bandpass filter is wider than a frequency range with high 1/f noise, the local oscillator frequency is set so that a central frequency of the converted detection signal is Direct Current (DC).

* * * * *